Nov. 5, 1957  E. C. SIEBENTHAL  2,812,064
CLOTH DISCHARGE FILTER
Filed Feb. 28, 1955  3 Sheets-Sheet 1

FIG. I

INVENTOR
ERNEST C. SIEBENTHAL
BY
HIS ATTORNEYS

INVENTOR
ERNEST C. SIEBENTHAL
BY
HIS ATTORNEYS

Nov. 5, 1957 E. C. SIEBENTHAL 2,812,064
CLOTH DISCHARGE FILTER
Filed Feb. 28, 1955 3 Sheets-Sheet 3

INVENTOR
ERNEST C. SIEBENTHAL
BY
HIS ATTORNEYS

2,812,064
CLOTH DISCHARGE FILTER

Ernest C. Siebenthal, Carlsbad, N. Mex., assignor to United States Borax & Chemical Corporation, a corporation of Nevada Application February 28, 1955, Serial No. 490,873

11 Claims. (Cl. 210—391)

This invention relates to continuous filtering apparatus wherein a rotary vacuum or suction drum having a foraminous or screen-like cylindrical surface is at least partially immersed in the liquid to be filtered (slurry) which is contained within a tub or tank, and an endless band in the form of a woven fabric having a length in excess of the circumference of the drum, is arranged to travel on the screen surface of the drum and is looped away from the drum at one side for removal or discharge of the filter cake and cleaning, after which the cloth returns to the drum.

More particularly, the invention relates to filtering apparatus of this type such as is disclosed in the copending application of William P. Wilson Serial No. 490,637, filed February 25, 1955 and assigned to the same assignee as the present application. In that apparatus the excess filter cloth which is looped away from the drum is supported in a pocket or trough formation, and an open pool of water is maintained within this trough by means of a suitable water supply from the cake removal sprays, or otherwise, and with the aid of barriers or dams at the opposite ends of the trough adjacent the side edges of the filter cloth. The body of water thus maintained has sufficient weight to provide the required tension for keeping the filter cloth taut, and the water also serves the additional function of exerting a smoothing action on the cloth so that it feeds properly onto the surface of the drum as it returns thereto.

The primary objects of the present invention are to facilitate the control of the body of water within the trough formation, and to increase the filtering capacity of apparatus of a given size. To these ends the present invention includes the provision of an elongated enclosed water container of porous material to which water is supplied by means of a flexible hose connection, or otherwise, such container extending substantially the full width of the filter cloth and having such volume that the weight of the water will supply the tension required in the operation of the endless filter cloth.

The water supplied to the container continuously flows through the porous walls of the container into the trough formation and then through the pores, or mesh, of the filter cloth, thus cleansing or washing the cloth before it returns to the suction drum. When the body of water is maintained as an open pool in the trough formation, the porosity of the filter cloth employed may be influenced by the ability of the cloth to maintain the pool. However, by employing the enclosed water container, a filter cloth may be used which has a coarser mesh than the material of the water container, thereby increasing the filtering capacity of the apparatus. In other words, the mesh of the fabric, preferably nylon, used for the water container will be such as to maintain a desired body of water within it and to produce the desired flow of water for washing the nylon filter cloth, the porosity of the water container fabric being independent of porosity of the filter cloth.

Another object of the invention is to control the depth of the trough formation, whether the water within it is an open body, as in the previously mentioned copending application, or contained in a closed container, or sack, as in the present application.

The invention will be described in connection with an apparatus for filtering a concentrated sodium-potassium chloride solution which contains slimes or solids of a colloidal nature. It will be understood, however, that the apparatus can be used to filter other materials, and among other uses are to be found the processing of sugar juices, uranium ores, and in the refining of certain petroleum products.

Additional objects and advantages of the invention will be apparent from the following description of the improved filtering apparatus as illustrated, by way of example, in the accompanying drawings.

Figure 1:
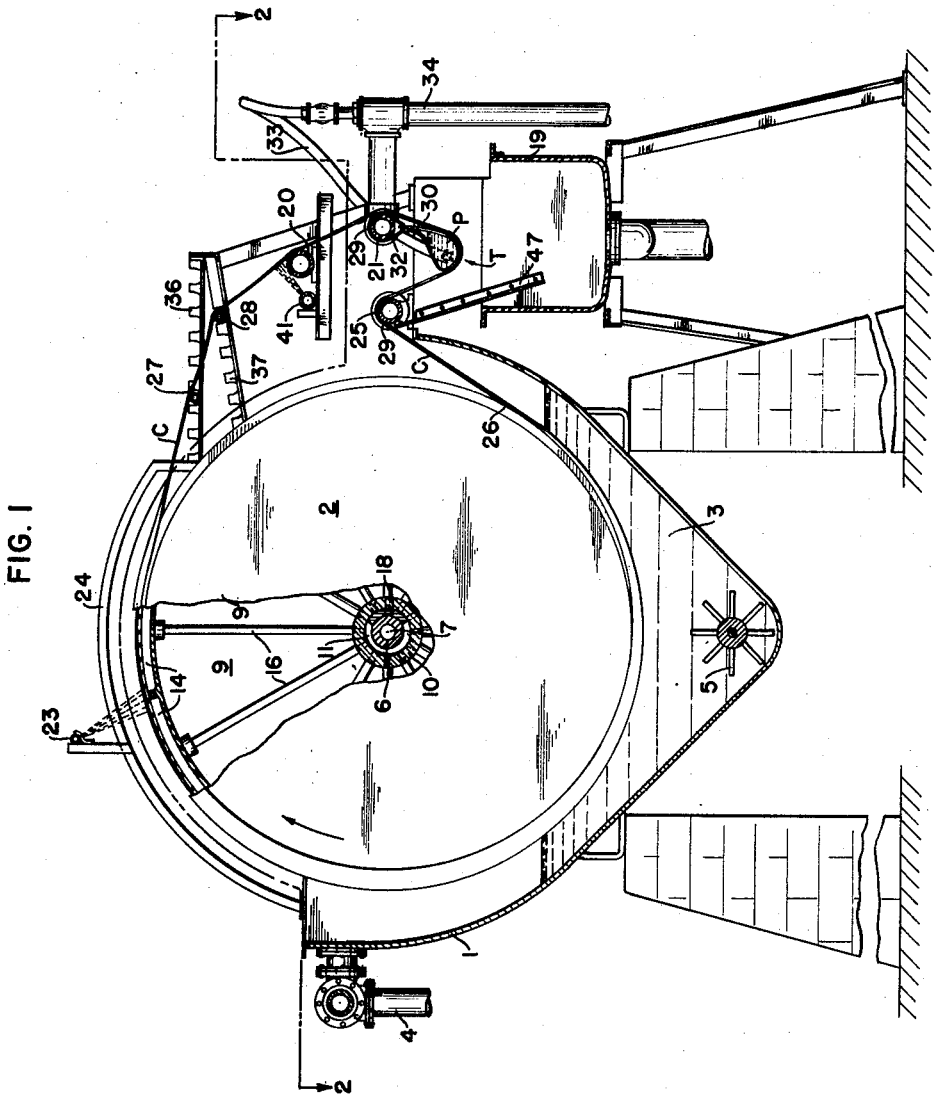
Fig. 1 is a transverse sectional view of the apparatus.

Referring now to these drawings, the tank or tub is indicated by reference numeral 1, and the rotary vacuum or suction filtering drum by reference numeral 2. This drum has a cloth-supporting, foraminous cylindrical surface, and closed end walls. The foraminous surface may be made of wire mesh, wire wrap, punched plate, or the like. The lower portion of the drum is immersed in the body of slurry 3, the general level of which is indicated in Fig. 1.

Figure 2:
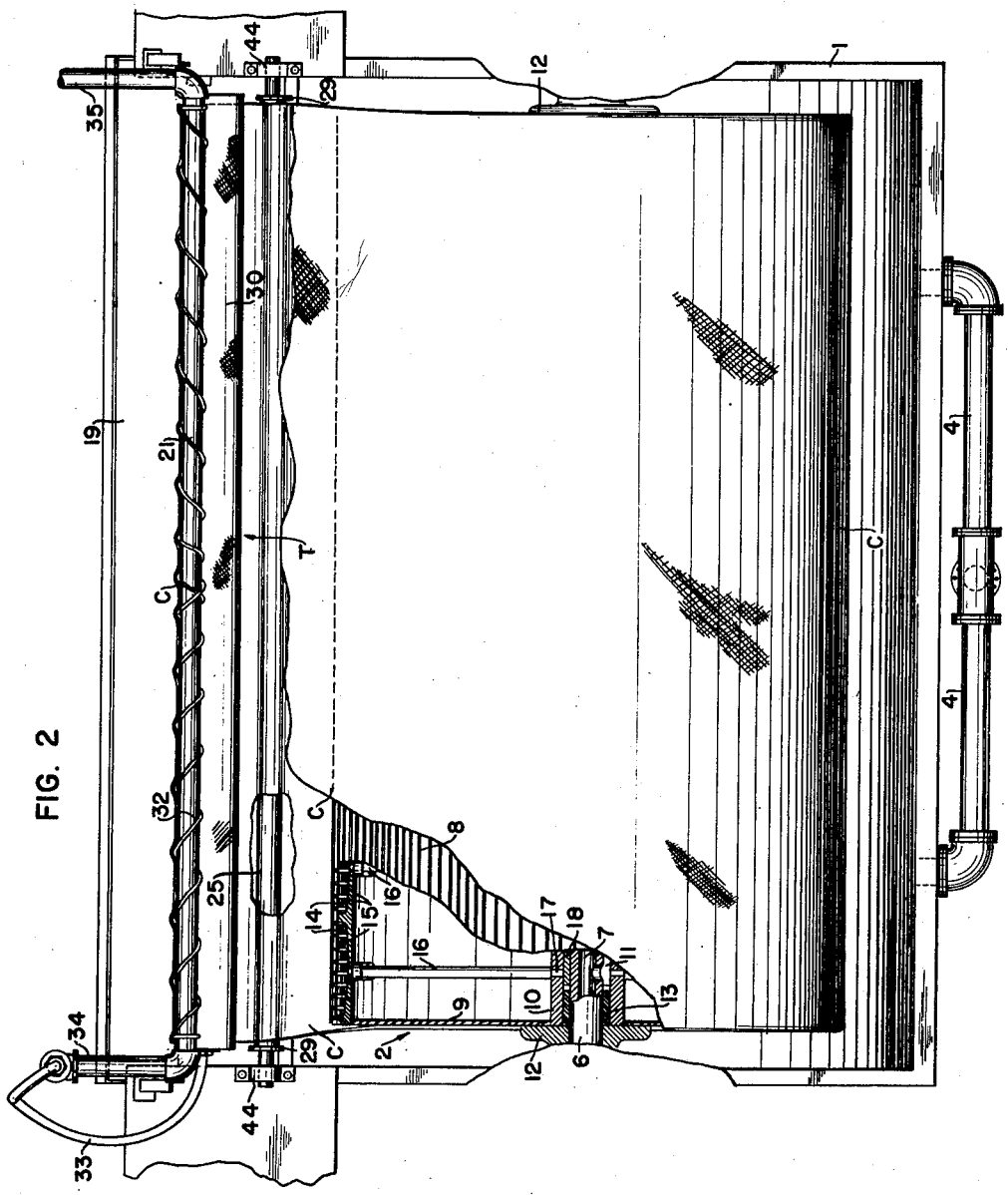
Fig. 2 is a plan view, with certain parts removed as indicated by the broken line 2—2 of Fig. 1, a portion of the drum being broken away and shown in central section.

The slurry is fed into tank 1 by a feed pipe 4 having branches, as shown in Fig. 2, so as to equalize the delivery between the end portions of the tank. A suitable control valve (not shown) is provided for regulating the flow. A continuously operated rotary stirring device 5, located in the bottom of tank 1, maintains the solids in suspension in the body of slurry 3.

Filtering drum 2 rotates on a stationary hollow shaft 6 which is mounted on suitable supports (not illustrated), at its opposite ends. Connections are made to the central passage 7 of the hollow shaft 6 at one or both ends with a filtrate collecting tank to which is connected a suitable source of suction such as a vacuum pump. Such connections are made through the shaft supports in a conventional manner. These shaft supports also house a driving mechanism (not shown) by means of which the filtering drum 2 is continuously rotated during the operation of the apparatus.

The filtering medium comprises an endless band, or cloth C, of nylon taffeta fabric, which is somewhat wider than the length of the filtering drum 2, its side edges overlapping the ends of the drum as indicated in Figs. 1 and 2. This endless cloth C is longer than the circumference of the drum and is looped away from the drum surface, as shown in Fig. 1, and carried over a series of supports and rollers, and the filter cake, or "mud," which collects on the surface of the drum during the filtering operation, is dislodged from it and discharged into a trough 19.

Figure 3:
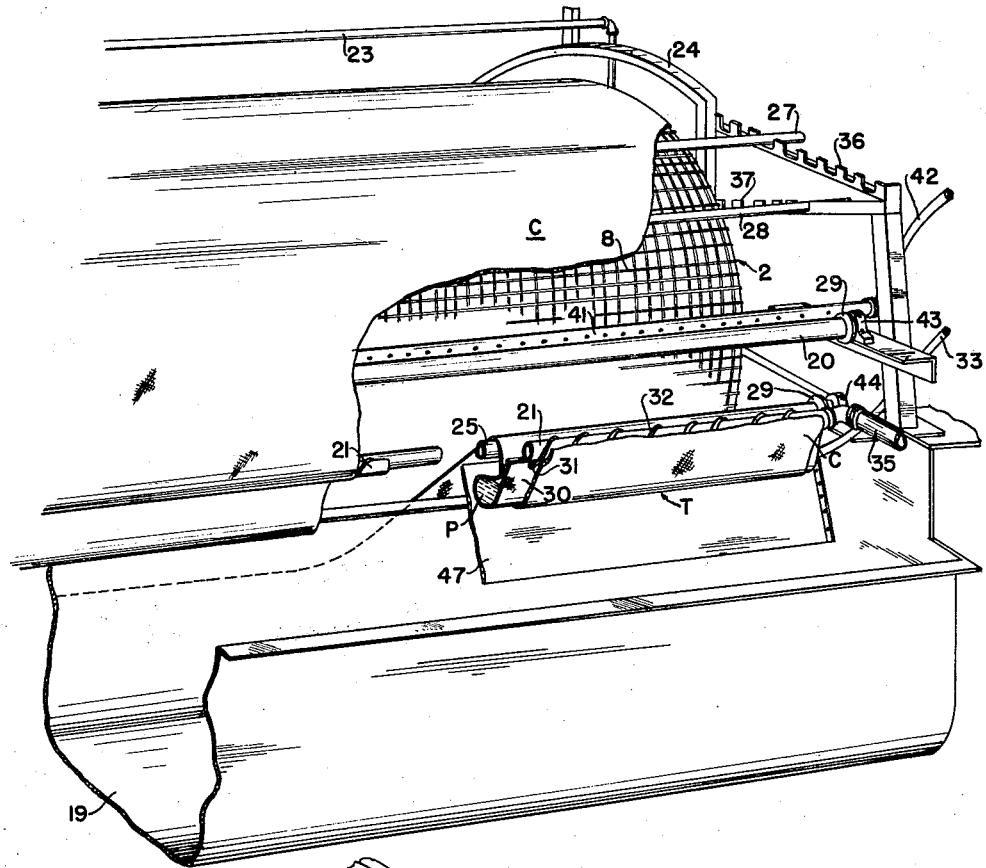
Fig. 3 is a perspective or projectional view of the right-hand portion of the apparatus as viewed from the right of Fig. 1 or from the top, left of Fig. 2.

The loop of the endless filtering cloth C is supported in such a manner as to provide a pocket, or trough formation T across the width of the cloth, and within this formation a body of water P is maintained (Figs. 1 and 3). The water is enclosed within a container, bag or sack which rests within the trough formation T, as will be described more fully below. The water, by its weight, provides the required tension in the cloth and causes the cloth to feed in a smooth, spread-out condition onto the drum surface, as will be referred to later.

Drum 2 has a cylindrical screen surface 8 and is closed at its opposite ends by circular sheet metal plates 9 which are apertured at their centers to receive a sleeve member 10 which is concentric with stationary shaft 6 and spaced therefrom as shown in Fig. 1 to provide an annular passageway 11 for the filtrate. Sleeve member 10 is secured at its opposite ends to the end plates 9 by means of flanged members 12, one of which is shown in Fig. 2. These parts are both bolted and welded together to provide strength and to seal the interior of the drum from the atmosphere.

In order to rotatably support the drum, collar members 13 are provided, one at each end of stationary shaft 6, and these collars also close the ends of the annular space 11 between shaft 6 and sleeve member 10. These two parts also include a valve structure to control the application of suction to the drum, as will presently appear. The driving mechanism for rotating the drum previously referred to is connected to the drum through the flanged members 12.

The cylindrical screen-like surface 8 of drum 2 is divided into sections or pockets 14 arranged in rows both circumferentially and longitudinally of the drum. The structure of screen surface 8 may vary considerably, but is preferably provided with spaced cylindrical ribs 15 to give it strength. Each of the pockets 14 is connected with the interior of the central sleeve member 10 by means of a suction pipe or tube 16.

The inner ends of these tubes may be secured to the outer surface of sleeve member 10 in any suitable manner as by welding as indicated in Fig. 2, and the interior of each tube connects with a radial passage 17 extending through the thickness of the sleeve to the interior thereof, that is, to the annular space 11. It will be understood from Figs. 1 and 2 that the arrangement is such that during the rotation of drum 2 the several longitudinal rows of pockets 14 will be connected, through their tubes 16 and passages 17, with the annular space 11 except during that portion of the rotation during which the passages 17 are blanked off or closed by means of a stationary arcuate valve member 18.

The endless filter cloth C contacts the drum at the approximate point where the drum enters the body of slurry 3, rotation being in the clockwise direction, and leaves the drum just to the right of the top. The filter cloth passes over one or more take-up bars (two being shown at 27 and 28) to be referred to later, and thence over a supporting roller 20, passing which it pitches downwardly at a steep angle and around the outside of a stationary cold water spray pipe 21, after which the filter cloth turns almost vertically downward and then upward again to form the trough T.

The filter cloth comprising the inner wall of this trough formation T passes over a guiding roller 25 which redirects the cloth downwardly over the edge of tank 1 and then onto the surface of the drum at 26, which point, as mentioned before, is slightly above or approximately at the level of the body of slurry 3. The rollers 20 and 25 are preferably flanged at each end as indicated by numeral 29 to facilitate control of the side edges of the filter cloth.

A filter cake wash spray pipe 23 is arranged lengthwise of the filtering drum 2 for the purpose of washing the cake after it has been raised on the surface of the drum and dewatered by the vacuum. This pipe is supported between suitable brackets which are mounted upon an arched frame 24 at each side of the apparatus.

The body of water P is maintained within a closed elongated container or sack 30 which extends substantially throughout the length of the trough formation T, that is, throughout the width of the filter cloth C. Sack 30 is made of a long narrow sheet of nylon taffeta fabric folded lengthwise and having its lengthwise edges brought together and pierced with equally spaced apertures one of which is indicated at 31 in Fig. 3. The sack is lashed to spray pipe 21 by means of a helically wound stiff wire 32 which is passed through apertures 31.

In applying wire 32 its helical formation is preferably reversed at the center of spray pipe 21 as shown in Fig. 2. In this way the spaced helices of the wire, oppositely directed on the opposite sides of the center of the spray pipe, serve to spread-out the cloth C as it passes downwardly from roller 20 over the helical wire formation and into the trough formation T.

The water container or sack 30 is maintained substantially full of water, the water being supplied through a flexible hose 33 which has a connection with one end of the sack as indicated in Figs. 1 and 3. Water for spray pipe 21 is supplied through pipes 34 and 35 which are connected to the opposite ends of pipe 21. Hose 33 may be connected to one of the supply pipes, for example, pipe 34.

The take-up bars 27 and 28 are provided for the purpose of controlling or regulating the amount or length of the filter cloth forming the trough formation T, so as to adjust the depth of this formation relative to the size of the water sack 30 and thus obtain the most favorable cooperation of the water sack with the trough formation. Accordingly, take-up bars 27, 28, which may conveniently consist of suitable lengths of pipe extending from side to side of the filter drum 2, are supported at their opposite ends in the desired position by means of notched frames 36 and 37, these pairs of frames being provided at each end of the filter drum.

Figure 4:
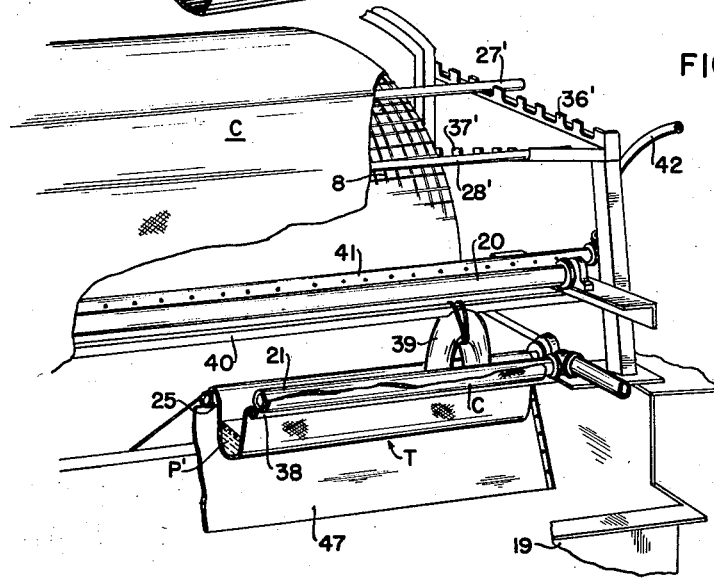
Fig. 4 is a view showing a modification of certain of the parts illustrated in Fig. 1.

Referring to Fig. 4, in which the trough formation T contains an open pool P' of water the take-up bars 27' and 28' are arranged to be adjusted in position in their supporting notched frames 36' and 37' for the purpose of regulating or controlling the amount of the filter cloth in the trough formation T, or in other words, the depth of this formation below a supporting spray pipe 38 and the tank edge roller 25.

Spray pipe 38 is an additional outside spray pipe which is positioned adjacent and somewhat below the inside spray pipe 21. This arrangement is preferred when the open-type water pool is used. To maintain the open pool P', it is necessary to arrange a dam, such for example as the inner tube 39 of a vehicle tire, or water jets at each end of the trough T. These are supported on a common bar 40 which is vertically adjustable by means not shown. It will also be understood that the take-up bars 27 and 28 may be shifted for the purpose of compensating for any stretching, or shrinking, in the length of the filter cloth C which may occur with the use of either the open or the enclosed types of water pool.

Adjacent the upper roller 20 and parallel to it there is arranged a spray bar or pipe 41 which is perforated with equally spaced holes as shown in Fig. 4 and directs a spray against the inner surface of the filter cloth C just before it passes over the upper roller 20. A supply of cold water is fed to spray pipe 41 through a hose 42 connected at one or both ends of the pipe as desired. This spray serves to loosen the filter cake on the exterior surface of the cloth C and also to lubricate the cloth in contact with roller 20. Anti-friction bearings 43 are, however, used for supporting roller 20, and similar bearings 44 for supporting the lower or tank edge roller 25. The cold water inside spray pipe 21 is similarly provided with uniformly spaced apertures throughout its length. A discharge plate 47 for directing the released or dislodged filter cake into the trough 19 extends downwardly from a point adjacent and somewhat below the inside surface of the tank edge roller 25.

In the operation of the apparatus, it will be understood that the drum 2 rotates continuously at a uniform speed in the clockwise direction as indicated by the arrow in Fig. 1. From the time the filter cloth contacts the surface of the drum at point 26, until it leaves the drum just to the right of the top center, suction is being applied as previously described through the pockets 14, that is to say, there is a difference in pressure between the outside and inside surfaces of the filter cloth. Accordingly, the solids from the slurry 3 are drawn against the outside surface of the cloth and carried upwardly.

The layer of solids is dewatered by the suction until it reaches the cake washing spray pipe 23, and after passing this spray the solids are again dewatered by the suction. The loop in the cloth C then carries the filter cake to the right, over the bars 27, 28 and past the spray pipe 41 and roller 20. At this point the spray on the inside surface loosens the solids and some of them descend along the outside of the filter cloth. As the cloth passes the second inside spray pipe 21, the bulk of the solids is dislodged and discharged into the trough 19.

The water from the pool P within the container or sack 30 flows outwardly through the mesh of the sack into trough formation T and serves as a lubricant between the relatively moving surfaces of cloth C and sack 30. To such water is added the water from spray pipes 21 and 41. This water flows in part through the interstices of the cloth C within the trough formation T and serves to wash out particles of solids remaining within or on the outside surface of the cloth after it passes the spray pipe 21 where the main discharge of filter cake takes place.

Some of this water flows out of the opposite ends of the trough formation T, and in so doing enhances the smoothing action of the water sack 30 on the cloth. The water both within and without the water sack 30 within the trough formation T, through its weight, supplies the necessary tension to keep the endless filter cloth taut, and serves to cause the cloth to track evenly as it approaches or feeds back onto the drum. It also causes the cloth to feed onto the drum surface in a smooth, spread-out condition.

The even tracking of the cloth on the drum is an important function of the water pool because if the cloth should run off the drum at one side or the other, it would expose vacuum openings in the surface of the drum and break the vacuum on the system. Due to the inequalities in the cloth and the tendency of the cloth to shift to one side or the other the employment of a pipe or roller for producing the cloth tension, would cause stretching of the cloth and tend to pull the sides inwardly and expose the drum surface, and also would not produce feeding of the cloth in a smooth and spread-out condition.

The two ends of the endless cloth C are joined together by means of a hookless, or slide, fastener (not shown). This type of fastener facilitates a quick change from an old to a new filter cloth, and also provides a light, strong seal between the ends of the cloth that will hold the pool and stand flexing over the various spray pipes and rollers, even when out of line due to shifting of the cloth. Other types of fasteners, however, may be used, if desired.

It will be understood that changes can be made in the construction and arrangement of the filtering apparatus as hereinabove described without departing from the scope of the present invention which is set forth in the appended claims.

I claim:

1. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in mechanism for cleansing and applying the operating tension to said filter cloth which comprises means associated with said trough comprising an enclosed water container of porous material resting on the surface of said trough and extending substantially the full width of said filter cloth, and means for supplying water to said container, said body of water within said container serving to apply the required tension and to exert a smoothing action on said endless cloth to cause it to feed properly onto the drum surface as it returns to the drum.

2. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in mechanism for cleansing and applying the operating tension to said filter cloth which comprises means associated with said supporting means for forming a body of water within said trough comprising an enclosed flexible water container of porous woven fabric resting on the surface of said trough and extending substantially the full width of said filter cloth, and means for supplying water to said container, said body of water serving to apply the required tension, and means for securing said flexible water container in rubbing contact with the surface of said trough formation to exert a smoothing action on said endless cloth to cause it to feed properly onto the drum surface as it returns to the drum.

3. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in mechanism for cleansing and applying the operating tension to said filter cloth which comprises means associated with said supporting means for forming a body of water within said trough comprising an enclosed water container of porous material resting in stationary position on the surface of said trough and extending substantially the full width of said filter cloth, and means for supplying water to said container, said body of water serving to apply the required tension and to exert a smoothing action on said endless cloth to cause it to feed properly onto the drum surface as it returns to the drum, the permeability of said container walls being sufficient to maintain a body of water within the container independently of the porosity of the filter cloth.

4. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, said trough supporting means including a pair of spaced parallel members defining the mouth of the trough, the improvement in mechanism for cleansing and applying the operating tension to said filter cloth which comprises a closed elongated water container in contact with substantially the full width of said filter cloth within said trough, said container being secured lengthwise to one of said spaced parallel members, and means for supplying water to the interior of said container.

5. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, said trough supporting means including a pair of spaced parallel members defining the mouth of the trough, the improvement in mechanism for cleansing and applying the operating tension to said filter cloth which comprises a closed elongated water container extending substantially the full width of said filter cloth within said trough, and means for supplying water to the interior of said container, said container comprising an elongated sheet of fabric material folded along the median line between its side edges and having said edges brought together and attached to one of said spaced parallel members.

6. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, said trough supporting means including a pair of spaced parallel members defining the mouth of the trough, the improvement in mechanism for cleansing and applying the operating tension to said filter cloth which comprises a closed elongated water container extending substantially the full width of said filter cloth within said trough, and means for supplying water to the interior of said container, said container comprising an elongated sheet of nylon fabric folded along the median line between its side edges and having said edges brought together and attached to one of said spaced parallel members.

7. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in mechanism for cleansing and applying the operating tension to said filter cloth which comprises means associated with said supporting means for forming a body of water within said trough of sufficient weight to provide the required tension, said body of water also exerting a smoothing action on said endless cloth to cause it to feed properly onto the drum surface, and means cooperating with the endless filter cloth for adjusting the depth of said trough formation.

8. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, the improvement in mechanism for cleansing and applying the operating tension to said filter cloth which comprises means associated with said supporting means for forming a body of water within said trough to apply the required tension and to exert a smoothing action on said endless cloth to cause it to feed properly onto the drum surface as it returns to the drum, a cloth-take-up member disposed beneath the cloth after it leaves the drum and before it enters said trough, and means for adjustably supporting said take-up member for varying the depth of said trough formation.

9. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, said trough supporting means including a pair of spaced parallel members defining the mouth of the trough, the improvement in mechanism for cleansing and applying the operating tension to said filter cloth which comprises a closed elongated water container extending substantially the full width of said filter cloth within said trough, said container being suspended along its length from one of said spaced parallel members, and means cooperating with the endless filter cloth for adjusting the depth of said trough formation below said parallel members so as to control the extent of the engagement of said water container with the bottom of said trough formation.

10. In a continuous vacuum filter having a tank, a rotary vacuum drum within said tank, an endless filter cloth passing around the drum and having a length in excess of the circumference of the drum, and means at one side of the drum for supporting said excess filter cloth in a trough formation extending from side to side of the cloth, the cloth being fed from the surface of the drum into said trough formation along one edge thereof and being returned to the surface of the drum from the opposite edge of said formation, said trough supporting means including a pair of spaced parallel members defining the mouth of the trough, the improvement in mechanism for cleansing and applying the operating tension to said filter cloth which comprises a closed elongated water container extending substantially the full width of said filter cloth within said trough, said container being suspended along its length from one of said spaced parallel members, and a cloth take-up member disposed beneath the endless filter cloth after it leaves the drum and before it enters said trough, and means for adjustably supporting said take-up member for varying the depth of said trough formation below said parallel members so as to control the extent of the engagement of said water container with the bottom of said trough formation.

11. The improvement in mechanism for cleansing an endless filter cloth and applying the operating tension thereto as set forth in claim 2, wherein the enclosed flexible water container is of woven nylon fabric.

References Cited in the file of this patent

UNITED STATES PATENTS

| 82,735 | Merrill | Oct. 6, 1868 |
| 777,316 | Tittel | Dec. 13, 1904 |
| 877,631 | Clark | Jan. 28, 1908 |
| 2,654,482 | Robinson et al. | Oct. 6, 1953 |

FOREIGN PATENTS

| 846,392 | Germany | Aug. 11, 1952 |